US006972766B2

(12) United States Patent
Nagayama

(10) Patent No.: US 6,972,766 B2
(45) Date of Patent: Dec. 6, 2005

(54) RECORDING MEDIUM STORING DYNAMIC PICTURE IMAGE GENERATION PROGRAM, DYNAMIC PICTURE IMAGE GENERATION PROGRAM, DYNAMIC PICTURE IMAGE GENERATION METHOD, AND DEVICE FOR THE SAME

(75) Inventor: Kentaro Nagayama, Osaka (JP)

(73) Assignees: Konami Corporation, Tokyo (JP); Konami Computer Entertainment Osaka, Inc., Osaka (JP)

( * ) Notice: Subject to any disclaimer, the term of this patent is extended or adjusted under 35 U.S.C. 154(b) by 351 days.

(21) Appl. No.: 10/208,385

(22) Filed: Jul. 29, 2002

(65) Prior Publication Data

US 2003/0032482 A1    Feb. 13, 2003

(30) Foreign Application Priority Data

Aug. 8, 2001    (JP) .............................. 2001-240447

(51) Int. Cl.[7] ............................................. G06T 15/70
(52) U.S. Cl. ...................... 345/473; 345/419; 345/619; 382/276
(58) Field of Search ............................... 345/473–475, 345/419–420, 581

(56) References Cited

U.S. PATENT DOCUMENTS 5,663,514 A * 9/1997 Usa .............................. 84/600
6,246,418 B1 * 6/2001 Oka ............................ 345/441
6,781,592 B2 * 8/2004 Murayama et al. ......... 345/585

OTHER PUBLICATIONS

Leif P. Kobbelt, Thilo Bareuther, Hans-Peter Seidel, Multi-resolution Shape Deformations for Meshes with Dynamic Vertex Connectivity, 2000, The Eurographics Association and Blackwell Publishers, vol. 19—Issue 3, pp, 5-6.*

P S Karthikeyan, P S Ranganathan, Tutorial on Cloth Modelling, May 2, 1998, India institute of Technology Madras, Web Page http://www.geocities.com/SiliconValley/Heights/5445/cloth.html.*

Lewis J. P.: "Algorithms for Solid Noise Synthesis", Computer Graphics, vol. 23, No. 3, Jul. 1989, pp. 263-270.

Cheng C., Xu Y.-Q. et al., Shi J., Shum H.-Y.: "Physically Based Real-time Animation of Hangings", Computer Graphics International Conference 2001, Jun. 3-9, 2001, pp. 257-264.

Lewis J P et al: "Pose Space Deformation: A Unified Approach to Shape Interpolation And Skeleton-Driven Deformation", Computer Graphics Proceedings. Siggraph, New York, NY: ACM US Jul. 23, 2000, pp. 165-172.

Li L et al: "A Model For Animating The Motion Of Cloth", Computer Graphics, Pergamon Press Ltd. Oxford, GB vol. 20, No. 1, 1996, pp. 137-156.

Ng H N et al: "Computer Graphics Techniques For Modeling Cloth", IEEE Computer Graphics And Applications, IEEE Inc. New York, US, vol. 16, No. 5, Sep. 1996, pp. 28-41.

* cited by examiner

Primary Examiner—Ulka J. Chauhan
Assistant Examiner—Enrique L. Santiago
(74) Attorney, Agent, or Firm—Jordan and Hamburg LLP

(57) ABSTRACT

In order to express undulation of a surface of an object realistically, a dynamic picture image generation device comprises a movement amount computation unit 310, which computes the movement amount for a vertex based on the connectedness, which is the degree of connection of a vertex to each skeleton, and on the reference movement amount, set for each skeleton of a model, which is the maximum value of the movement amount of a vertex connected only to the skeleton; a direction computation unit 311, which computes the movement direction of vertices comprised by each polygon; and a coordinate computation unit 312, which computes the coordinates of a vertex after a prescribed time, using the movement amount computed by the movement amount computation unit 310 and the movement direction computed by the direction computation unit 311.

10 Claims, 8 Drawing Sheets

FIG.5

| SKELETON NO. \ VERTEX NO. | 801 | 802 | 803 | ... | 899 |
|---|---|---|---|---|---|
| 701 | 100 | 50 | 30 | ... | 100 |
| 702 | 0 | 50 | 70 | | 0 |
| 703 | 0 | 0 | 0 | | 0 |
| 704 | 0 | 0 | 0 | | 0 |
| 705 | 0 | 0 | 0 | | 0 |
| 706 | 0 | 0 | 0 | | 0 |
| 707 | 0 | 0 | 0 | | 0 |
| 708 | 0 | 0 | 0 | | 0 |
| 709 | 0 | 0 | 0 | | 0 |
| 710 | 0 | 0 | 0 | | 0 |
| 711 | 0 | 0 | 0 | | 0 |
| 712 | 0 | 0 | 0 | | 0 |
| 713 | 0 | 0 | 0 | ... | 100 |

FIG.6

| SKELETON NUMBER | SKELETON NAME | REFERENCE MOVEMENT AMOUNT |
|---|---|---|
| 701 | HEAD | 1 |
| 702 | NECK | 2 |
| 703 | RIGHT SHOULDER | 3 |
| 704 | RIGHT ARM 1 | 6 |
| 705 | RIGHT ARM 2 | 5 |
| 706 | RIGHT HAND | 3 |
| 707 | LEFT SHOULDER | 3 |
| 708 | LEFT ARM 1 | 6 |
| 709 | LEFT ARM 2 | 5 |
| 710 | LEFT HAND | 3 |
| 711 | CHEST | 8 |
| 712 | STOMACH | 10 |
| 713 | WAIST | 8 |

RECORDING MEDIUM STORING DYNAMIC PICTURE IMAGE GENERATION PROGRAM, DYNAMIC PICTURE IMAGE GENERATION PROGRAM, DYNAMIC PICTURE IMAGE GENERATION METHOD, AND DEVICE FOR THE SAME

BACKGROUND OF THE INVENTION

1. Field of the Invention

This invention relates to dynamic picture image generation technology which can be applied to video games, computer graphics and similar, which generates dynamic picture image data in which the surface of a model, comprising a plurality of polygons and a plurality of skeletons specifying the display positions of each polygon, undulates irregularly.

2. Description of the Related Art

In recent years, a variety of game devices, in which objects (or characters) are displayed in a virtual three-dimensional space created within a monitor screen, have come into widespread use. Among such game devices are those which simulate skiing, surfing, skateboarding, snowboarding, and similar. In such games, objects move within a virtual three-dimensional space, and by displaying dynamic picture image such that the surface of an object (for example, clothes worn by a character) is blown by the wind and so appears to undulate, the sense of realism can be enhanced.

In the prior art, undulation of the surface of an object in accordance with a typical scene is stored in advance as motion data, and as the game advances, judgments are made as to whether a scene for display is one of the above typical scenes, and the motion data is read out for display.

However, in the above method, there is a limit to the amount of motion data that can be stored, and there is a limit to the ability to represent undulation of the surfaces of objects with a sufficient sense of realism. On the other hand, a method is conceivable in which a surface of an object is simply vibrated irregularly with a fixed amplitude (with the period or position made irregular); but in this method, the movements of the surface of the object are unnatural, and it is difficult to express the motion of the object surface sufficiently realistically.

SUMMARY OF THE INVENTION

This invention was devised in light of the above problem, and has as an object the provision of a dynamic picture image generation program, a recording medium storing said program, dynamic picture image generation method, and device for the same enabling the expression of realistic undulation of the surface of an object. In order to achieve the above object, the present invention relates to a recording medium which stores a dynamic picture image generation program which generates dynamic picture image in which the surface of a model, comprising a plurality of polygons and a plurality of skeletons specifying the display positions of each polygon, undulates irregularly, said program causes a computer to function as: vertex coordinate storage means, which stores the coordinates of the vertices comprised by each polygon; connectedness storage means, which stores connectedness, which is the degree of connection of the vertices comprised by each polygon to each skeleton; reference movement amount storage means, set for each skeleton, which stores the amount of reference movement which is the maximum amount of movement of a vertex connected only to the skeleton; movement amount computation means, which computes the amount of movement of a vertex based on the above connectedness and the above reference movement amounts; direction computation means, which computes the movement direction for vertices comprised by each polygon; and coordinate computation means, which computes coordinates after a prescribed amount of time from the above vertex coordinates, from the above movement amounts, and from the above movement directions.

According to the aforementioned invention, a dynamic picture image generation program, stored in the recording medium, which generates dynamic picture image in which the surface of a model, comprising a plurality of polygons and a plurality of skeletons specifying the display positions of each polygon, undulates irregularly (the magnitude or the direction of the motion changes irregularly), and the computer is made to function as vertex coordinate storage means, which stores the coordinates of the vertices comprised by each polygon; connectedness storage means, which stores connectedness, which is the degree of connection of the vertices comprised by each polygon to each skeleton; reference movement amount storage means, set for each skeleton, which stores the amount of reference movement which is the maximum amount of movement of a vertex connected only to the skeleton; movement amount computation means, which computes the amount of movement of a vertex based on the connectedness and the reference movement amounts; direction computation means, which computes the movement direction for vertices comprised by each polygon; and, coordinate computation means, which computes coordinates after a prescribed amount of time from the vertex coordinates, from the movement amounts, and from the movement directions.

In other words, the coordinates of the vertices comprised by each polygon are stored in the vertex coordinate storage means; the connectedness, which is the degree of connection of the vertices comprised by each polygon with each skeleton, is stored in the connectedness storage means; reference movement amounts, set for each skeleton, which are the maximum values of movement amounts of vertices connected only to the skeleton, are stored in the reference movement amount storage means; the amounts of movement of vertices are computed by the movement amount computation means based on the connectedness and reference movement amounts; movement directions of vertices comprised by each polygon are computed by the direction computation means; and, the coordinates of vertices after a prescribed time are computed from the coordinates of vertices and from the movement amounts and directions.

In this way, movement amounts of vertices are computed based on connectedness and reference movement amounts in movement amount computation processing, so that by appropriately setting the connectedness and reference movement amounts, the desired (appropriate) movement amounts are obtained. For example, when the clothing worn by a character is blown by the wind and undulates, if reference movement amounts are set for each skeleton such that the connected skeletons differ depending on the site of the clothing model, then movement amounts, that is, the range of undulation will differ (for example, the range of undulation in the vicinity of a collar and a sleeve opening is small, and the range of undulation near the stomach area is large), and so the sense of realism is heightened. Further, movement directions of vertices comprised by each polygon are computed in direction computation processing, and vertex coordinates after a prescribed time are computed from vertex coordinates and from movement amounts and directions in coordinate computation processing, so that realistic undulation can be expressed.

These and other objects, features, and advantages of the present invention will become more apparent upon reading the following detailed description along with the accompanying drawings.

BRIEF DESCRIPTION OF THE DRAWINGS

FIG. 5 is a table indicating an example of connectedness of each of the vertices comprised by the polygons of the upper garment model to each of the skeletons;

FIG. 6 is a table showing one example of reference movement amounts of each of the skeletons;

DESCRIPTION OF THE PREFERRED EMBODIMENTS

Figure 1:
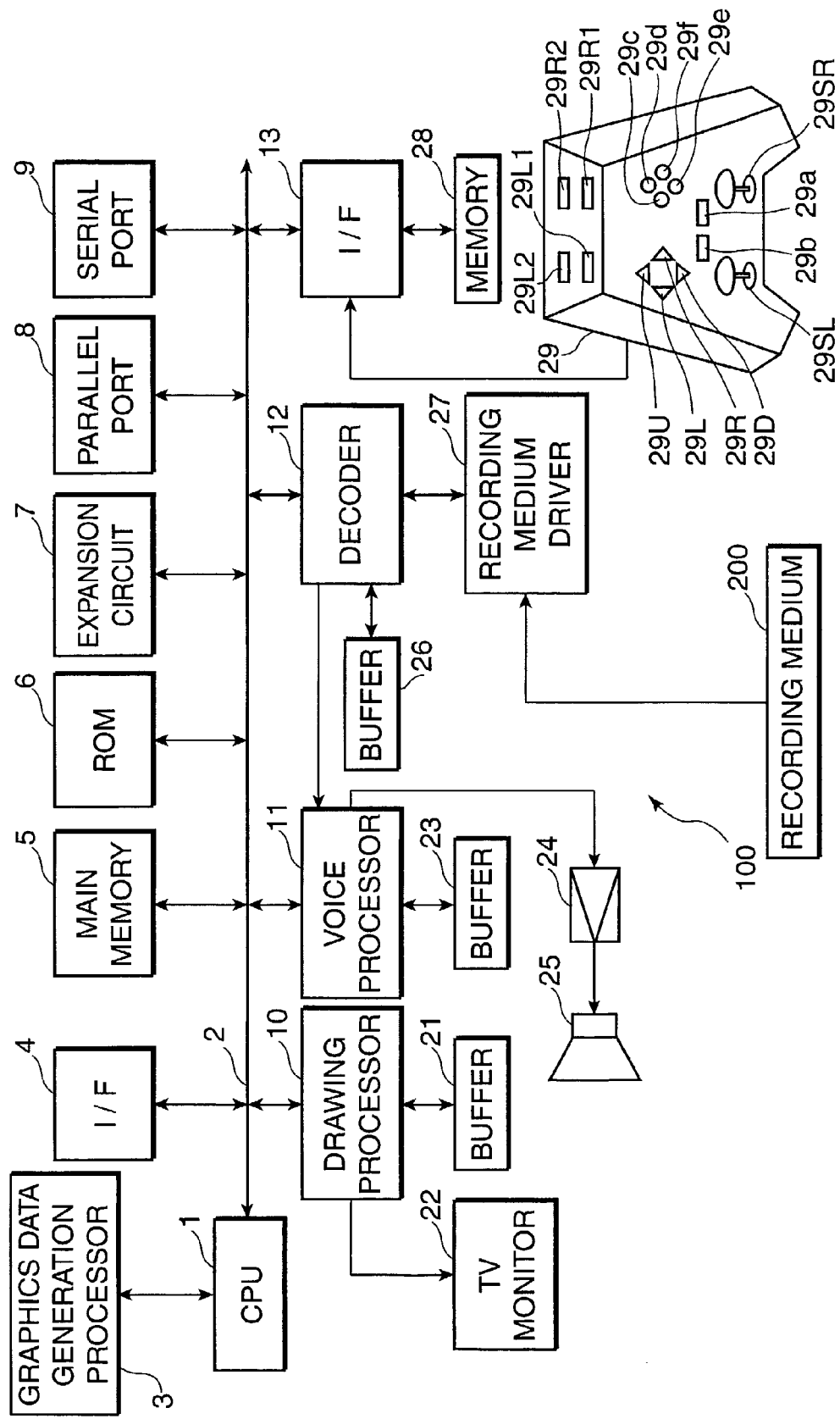
FIG. 1 is a block diagram showing one aspect of video game device to which a dynamic picture image generation device of this invention is applied.

FIG. 1 is a block diagram showing one aspect of video game device to which a dynamic picture image generation device of this invention is applied. This video game device comprises a game main unit 100 and recording medium 200 on which is recorded program data. The game main unit 100 comprises a CPU (Central Processing Unit) 1; a bus line 2 comprising an address bus, data bus, and control bus; and a graphics data generation processor 3.

The bus line 2 is connected to an interface circuit 4; RAM (Random Access Memory) or other main memory 5; ROM (Read-Only Memory) 6; an expander circuit 7; a parallel port 8; a serial port 9; a drawing processor 10; a voice (audio) processor 11; a decoder 12; and an interface circuit 13. The drawing processor 10 is connected to a buffer 21, as well as to a television monitor (hereafter "monitor") 22; the voice processor 11 is connected to a buffer 23, and to a speaker 25 via an amplifier circuit 24. The decoder 12 is connected to a buffer 26 and to a recording medium driver 27; the interface circuit 13 is connected to memory 28, as well as to a controller 29.

The form of this video game device will differ according to the application. For example, when this video game device is configured for home use, the monitor 22 and speaker 25 will be separate from the game main unit 100. On the other hand, when the video game device is configured for commercial use, the components shown in FIG. 1 will all be housed in a single cabinet. And when this video game device is configured with a personal computer or workstation as the core, the monitor 22 will correspond to the computer display; the drawing processor 10, voice processor 11, and expander circuit 7 will respectively correspond to a portion of the program data recorded on the recording medium 200 or to hardware on an expansion board mounted in an expansion slot of the computer; and the interface circuit 4, parallel port 8, serial port 9, and interface circuit 13 will correspond to hardware on expansion boards mounted in expansion slots in the computer. The buffers 21, 23, 26 will each correspond to areas in main memory 5 or in expansion memory (not shown). In this aspect, an explanation is given for an example in which the video game device is configured for home use.

Next, each of the components shown in FIG. 1 is explained. The graphics data generation processor 3 plays the role of a coprocessor to the CPU 1. That is, the graphics data generation processor 3 employs parallel processing to execute coordinate transformation, light source calculations, and for example fixed-point format matrix and vector operations. The main processing performed by the graphics data generation processor 3 is computation of addresses in the display area of images for processing, based on coordinate data for each vertex in two-dimensional or three-dimensional space among image data supplied by the CPU 1, on movement amount data and on rotation amount data, as well as processing to return the address data to the CPU 1, and processing to calculate the brightness of an image according to distances from virtual light sources.

The interface circuit 4 is used as an interface to peripheral devices, such as for example a mouse, trackball, or other pointing device. The ROM 6 stores program data as the operating system of the video game device, and in terms of a personal computer, corresponds to the BIOS (basic input/output system).

The expander circuit 7 performs expansion processing of compressed images, compressed by inline encoding conforming to MPEG (Moving Picture Engineering Group) standards for dynamic picture image and to JPEG (Joint Picture Engineering Group) standards for still images. The expansion processing may include decoding (decoding of data encoded using a VLC, or variable length code), inverse quantization processing, IDCT (Inverse Discrete Cosine Transform) processing, and inline image restoration processing. The drawing processor 10 performs display processing of data in the buffer 21 at a prescribed time T (one frame, for example T=1/60 second), based on a display instruction from the CPU 1.

The buffer 21 comprises RAM, for example, and includes a display area (frame buffer) and a non-display area. The frame area comprises an area for expansion of data to be displayed on the screen of the monitor 22. In this aspect, the non-display area comprises storage areas for texture data, color palette data and similar, in addition to storage areas for data to define skeletons, model data to define polygons, animation data causing models to move, and pattern data indicating the contents of each animation.

Here, texture data is two-dimensional image data. Color palette data is data used to specify the colors of texture data and similar. This data is recorded in the non-display buffer area of the buffer 21 in advance by the CPU 1 from the recording medium 200, either all at once, or divided into a plurality of operations according to the game progress. Display instructions include display instructions to display three-dimensional images using polygons, and display instructions to display normal two-dimensional images. Here a polygon is a two-dimensional virtual polygonal figure; in this aspect, triangle figures are used. Display instructions used to display three-dimensional images using polygons are executed for polygon vertex address data in the display area of the buffer 21; texture address data indicating the storage position in the buffer 21 of texture data to be applied to polygons; color palette address data indicating the storage position in the buffer 21 of color palette data indicating the color of texture data; and brightness data indicating the brightness of a texture.

Of this data, the polygon vertex address data in the display area is obtained when the graphics data generation processor 3 replaces coordinate data for polygon vertices in three-dimensional space, obtained from the CPU 1, with coordinate data for polygon vertices in two dimensions, obtained by coordinate transformations based on the movement amount data and rotation amount data of the image itself. Brightness data is determined by the graphics data generation processor 3, based on the distance from the positions indicated by coordinate data of polygon vertices from the CPU 1 after the above coordinate transformations, to virtual light sources. The above polygon vertex address data indicates addresses in the display area of the buffer 21; the drawing processor 10 performs writing of texture data corresponding to the range of the display area in the buffer 21 indicated by three polygon vertex addresses.

Characters and other objects in the virtual game space comprise numerous polygons. The CPU 1 associates coordinate data for each polygon in the three-dimensional space with vector data for the corresponding skeleton, and stores this data in the buffer 21. Then, by means of operation of the controller 29, described below, when a character is to be moved on the screen—that is, when movement of a character itself is to be represented, or when the position from which the character is viewed is to be changed—the following processing is performed.

That is, the CPU 1 provides the graphics data generation processor 3 with three-dimensional coordinate data for each polygon, and movement amount data and rotation amount data for each polygon computed from data for skeleton coordinates and the rotation amounts for same, held in the non-display area of the buffer 21. The graphics data generation processor 3 computes, in sequence, three-dimensional coordinate data after movement and rotation of each polygon, based on three-dimensional coordinate data for the vertices of each polygon and the movement amount data and rotation amount data for each polygon. Of the three-dimensional coordinate data for the polygons obtained in this way, coordinate data in the horizontal and vertical directions is provided to the drawing processor 10 as address data in the display area of the buffer 21, that is, as polygon vertex address data. The drawing processor 10 writes texture data indicated by texture address data, allocated in advance, to the triangular display area in the buffer 21 indicated by the three polygon vertex addresses. By this means, an object is displayed in which texture data is applied to numerous polygons on the display screen of the monitor 22.

A display instruction to display a normal two-dimensional image is executed for vertex address data, texture address data, color palette address data indicating the storage position in the buffer 21 of color palette data indicating the color of texture data, and for brightness data indicating the brightness of a texture. Of this data, the vertex address data is coordinate data obtained by coordinate transformation, performed by the graphics data generation processor 3, of vertex coordinate data in a two-dimensional plane from the CPU 1, based on movement amount data and rotation amount data from the CPU 1.

The voice processor 11 stores ADPCM (Adaptive Differential Pulse Code Modulation) data read from the recording medium 200 in the buffer 23, and employs the ADPCM data stored in this buffer 23 as a sound source. The voice processor 11 reads out this ADPCM data based on a clock signal with a frequency of, for example, 44.1 kHz. The voice processor 11 subjects ADPCM data read from the buffer 23 to pitch conversion, noise addition, envelope setting, level setting, reverb addition, and other processing.

When audio data read from the recording medium 200 is PCM data from CDDA (Compact Disc Digital Audio) or similar, the voice processor 11 converts this into ADPCM data. Processing of PCM data by program data is performed directly in the main memory 5. PCM data processed in main memory 5 is supplied to the voice processor 11, and after conversion into ADPCM data is subjected to various processing as described above, and is then output as audio signals to the speaker 25.

The recording medium driver 27 is, for example, a CD-ROM drive, hard disk drive, optical disc drive, flexible disk drive, silicon disk drive, cassette media readout device, or similar. The recording medium 200 is, for example, a CD-ROM disc, hard disk, optical disc, flexible disk, semiconductor memory, or similar. The recording medium driver 27 reads images, audio data, and program data from the recording medium 200, and supplies the read data to the decoder 12. The decoder 12 performs error correction processing on the data reproduced from the recording driver 27 using an ECC (Error Correction Code), and supplies the data, subjected to error correction processing, to the main memory 5 or to the voice processor 11. The memory 28 comprises, for example, holder or card type memory. Card type memory is used to hold various game parameters at the time of an interruption, such as for example to preserve the state when the game is interrupted midway.

The controller 29 is operation means which can be operated from outside, and comprises a first left button 29L1, a second left button 29L2, a first right button 29R1, a second right button 29R2, an up-direction key 29U, a down-direction key 29D, a left-direction key 29L, a right-direction key 29R, a start button 29a, a select button 29b, a first button 29c, a second button 29d, a third button 29e, a fourth button 29f, a left joystick 29SL, and a right joystick 29SR, and sends operation signals to the CPU 1 according to operation by the player. The up-direction key 29U, down-direction key 29D, left-direction key 29L, and right-direction key 29R are used by the player to send commands to the CPU 1 instructing, for example, a character or cursor to move up, down, left, or right on the screen of the monitor 22. The start button 29a is used by the player to instruct the CPU 1 to initiate the game program data loaded from the recording medium 200. The select button 29b is used by the player to instruct the CPU 1 to select among various types of game program data loaded into main memory 5 from the recording medium 200.

Of the components of the controller 29, each of the buttons and keys, excluding the left joystick 29SL and right joystick 29SR, comprises an on-off switch which is turned on upon being depressed from a neutral position by a depressing force from outside, and returns to the above neutral position and is turned off when the depressing force is removed. The left joystick 29SL and right joystick 29SR are stick-type controllers with substantially the same configuration as a joystick. In other words, the left and right joysticks have an upright stick, which can be tilted freely through 360°, including forward, backward, right and left, with a prescribed position of the stick as a fulcrum. An X-coordinate in the right-left direction and Y-coordinate in the forward-backward direction are transmitted to the CPU 1 as operation signals, via the interface circuit 13, according to the stick tilt direction and tilt angle, with the upright position as the origin. The functions of the first left button 29L1, second left button 29L2, first right button 29R1, and second right button 29R2 differ depending on the game program data loaded from the recording medium 200.

Next, a summary of the operation of the video game device is given. The power switch (not shown) is turned on, and power is input to the video game device. At this time, the recording medium 200 is already loaded into the recording medium driver 27, and the CPU 1 instructs the recording medium driver 27 to read program data from the recording medium 200, based on the operating system stored in the ROM 6. By this means, the recording medium driver 27 reads image, audio, and program data from the recording medium 200. The read-out image, audio, and program data are provided to the decoder 12, and error correction processing is here performed.

Image data subjected to error correction processing in the decoder 12 is provided to the expander circuit 7 via a bus line 2, and here the above-described expansion processing is performed, after which the data is provided to the drawing processor 10; by means of this drawing processor 10, the data is written to the non-display area of the buffer 21. Audio data subjected to error correction processing in the decoder 12 is either written to main memory 5, or is provided to the voice processor 11 and written to the buffer 23. Program data subjected to error correction processing in the decoder 12 is written to main memory 5. Subsequently, the CPU 1 causes the game to proceed according to the game program data stored in main memory 5 and according to instructions issued by the player via the controller 29. That is, the CPU 1 exercises image processing control, audio processing control, and internal processing control as appropriate, based on the contents of instructions issued by the player via the controller 29.

As image processing control, in this aspect, for example, coordinate data of polygon vertices and the coordinates of each skeleton are calculated from pattern data applicable to action a character is instructed to take; the three-dimensional coordinate data and viewpoint-position data obtained are provided to the graphics data generation processor 3; and display instructions are issued, including instructions related to brightness data and to address data in the display area of the buffer 21 computed by the graphics data generation processor 3. As audio processing control, for example, audio output commands are issued to the voice processor 11, and level, reverb and other parameters are specified. As internal processing control, for example, processing is performed in response to operation of the controller 29.

Figure 2:
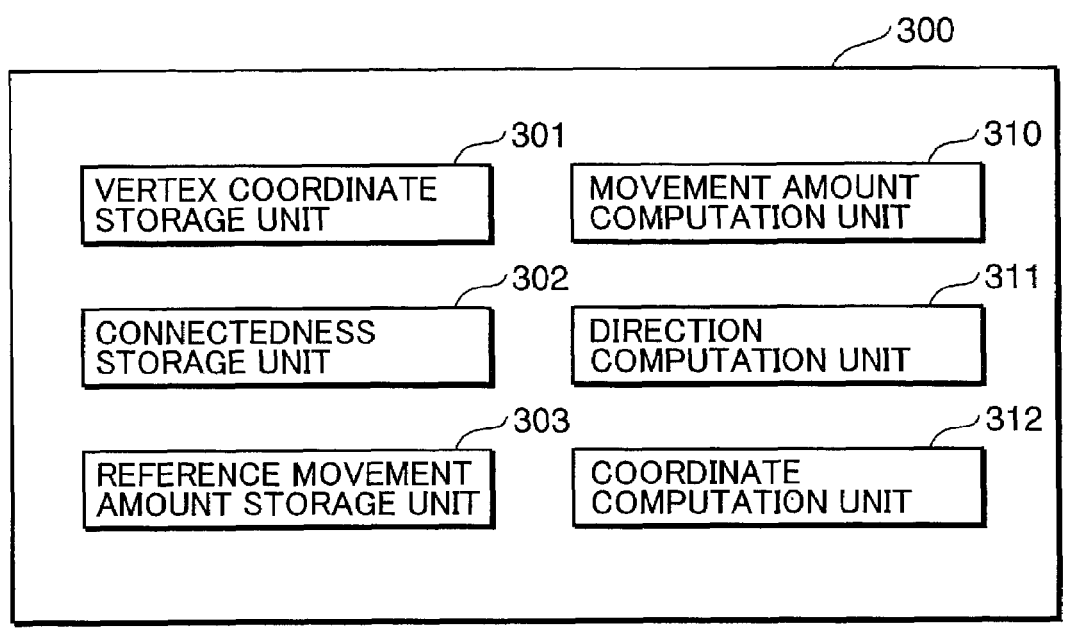
FIG. 2 is a functional block diagram of a dynamic picture image generation device.

FIG. 2 is a functional block diagram of a dynamic picture image generation device. The dynamic picture image generation program of this invention is, similarly to the above-described game program, recorded on the recording medium 200 shown in FIG. 1, and is loaded into main memory 5; the dynamic picture image generation device is realized by having the CPU 1 execute in sequence the dynamic picture image generation program in main memory 5, while receiving operations input by the player via the controller 29.

The dynamic picture image generation device 300 comprises a vertex coordinate storage unit 301, which stores the coordinates of vertices comprised by each polygon of a model; a connectedness storage unit 302, which stores the connectedness, which is the degree of connection of the vertices comprised by each polygon of the model to each skeleton; a reference movement amount storage unit 303, which stores the reference movement amount, set for each skeleton of the model, which is the maximum value of the movement amount of a vertex connected only to the skeleton; a movement amount computation unit 310, which computes the movement amount of a vertex based on the connectedness stored in the connectedness storage unit 302 and on the reference movement amount stored in the reference movement amount storage unit 303; a direction computation unit 311, which computes the movement directions of the vertices comprised by each polygon; and a coordinate computation unit 312, which computes the coordinates of vertices after a prescribed time (for example, one frame, where one frame=1/60 second), from the coordinates of vertices stored in the vertex coordinate storage unit 301, the movement amounts computed by the movement amount computation unit 310, and the movement directions computed by the direction computation unit 311. In this aspect, the case is explained in which dynamic picture image of the irregular undulation (with movement magnitude and direction changing irregularly) of the surface of an upper garment model, connected to skeletons representing the upper half of a human body, is generated.

Figure 3A:
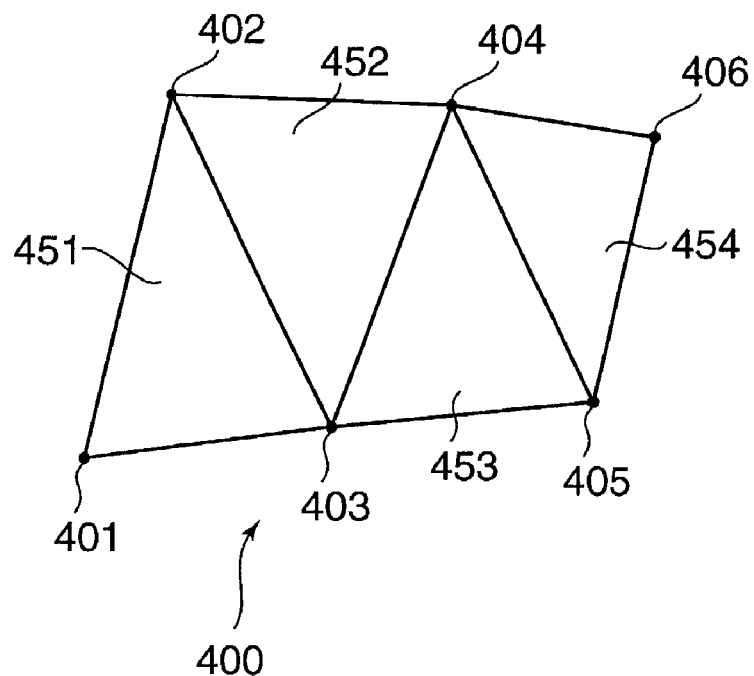
FIGS. 3A and 3B are conceptual diagrams showing the relation between polygons and vertices.
Figure 3B:
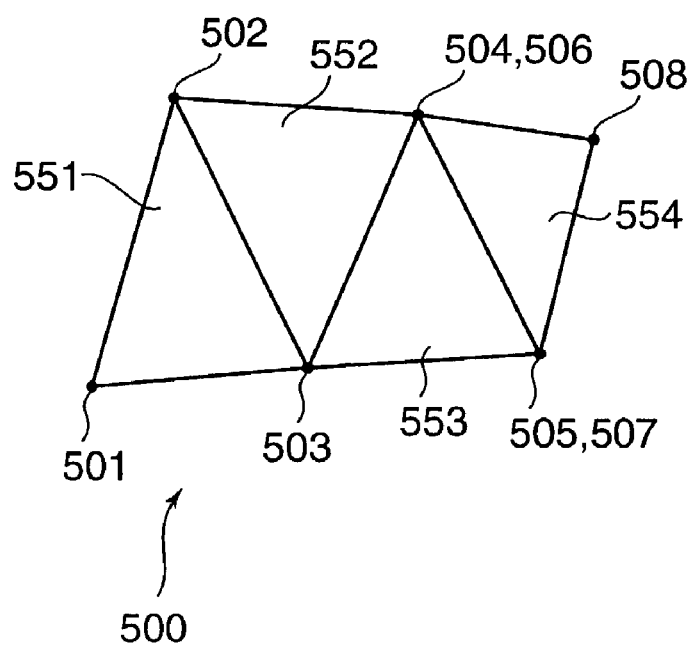

The vertex coordinate storage unit 301 stores initial coordinate data for vertices comprised by each polygon of a model, as well as coordinate data after a prescribed time (after movement), computed by the coordinate computation unit 312. In this aspect, the case in which the polygons are triangles is explained; hence each polygon comprises three vertices. FIGS. 3A and 3B are conceptual diagrams showing the relation between polygons and vertices. FIG. 3A is the case in which vertices at the same coordinates are treated as one vertex (normal case); FIG. 3B is the case in which, even when some vertices are at the same coordinates, the vertices are treated as two vertices (as separate vertices).

In FIG. 3A, for example, the polygon 453 comprises three vertices 403, 404, 405, and the polygon 454 comprises three vertices 404, 405, 406. That is, the vertices 404, 405 are common to the polygons 453 and 454. In FIG. 3B, for example, the polygon 553 comprises three vertices 503, 504, 505, and the polygon 554 comprises three vertices 506, 507, 508. That is, the vertices 504 and 506, and the vertices 505 and 507, are at the same coordinates, but are treated as different vertices.

For example, in a case in which the polygon 553 and the polygon 554 are comprised by different models, then even when, as in FIG. 3B, the vertices are at the same coordinates, they are treated as different vertices. In such a case, by simply generating random numbers, the movement amount or movement direction for each vertex is computed, and when expressing undulation of the model, the movement amounts or movement directions of the vertices at the same coordinates will differ, so that an image is formed with a step (or a gap) between adjacent polygons. Hence it is necessary to judge whether vertices are at the same coordinates or not; however, performing this judgment for all vertices would entail a large amount of calculation. In this aspect, by generating the random numbers used to compute movement amounts or movement directions, as explained below, derived from the initial value of a random number determined by a value based on the vertex coordinates, the above problem can be resolved.

Figure 4:
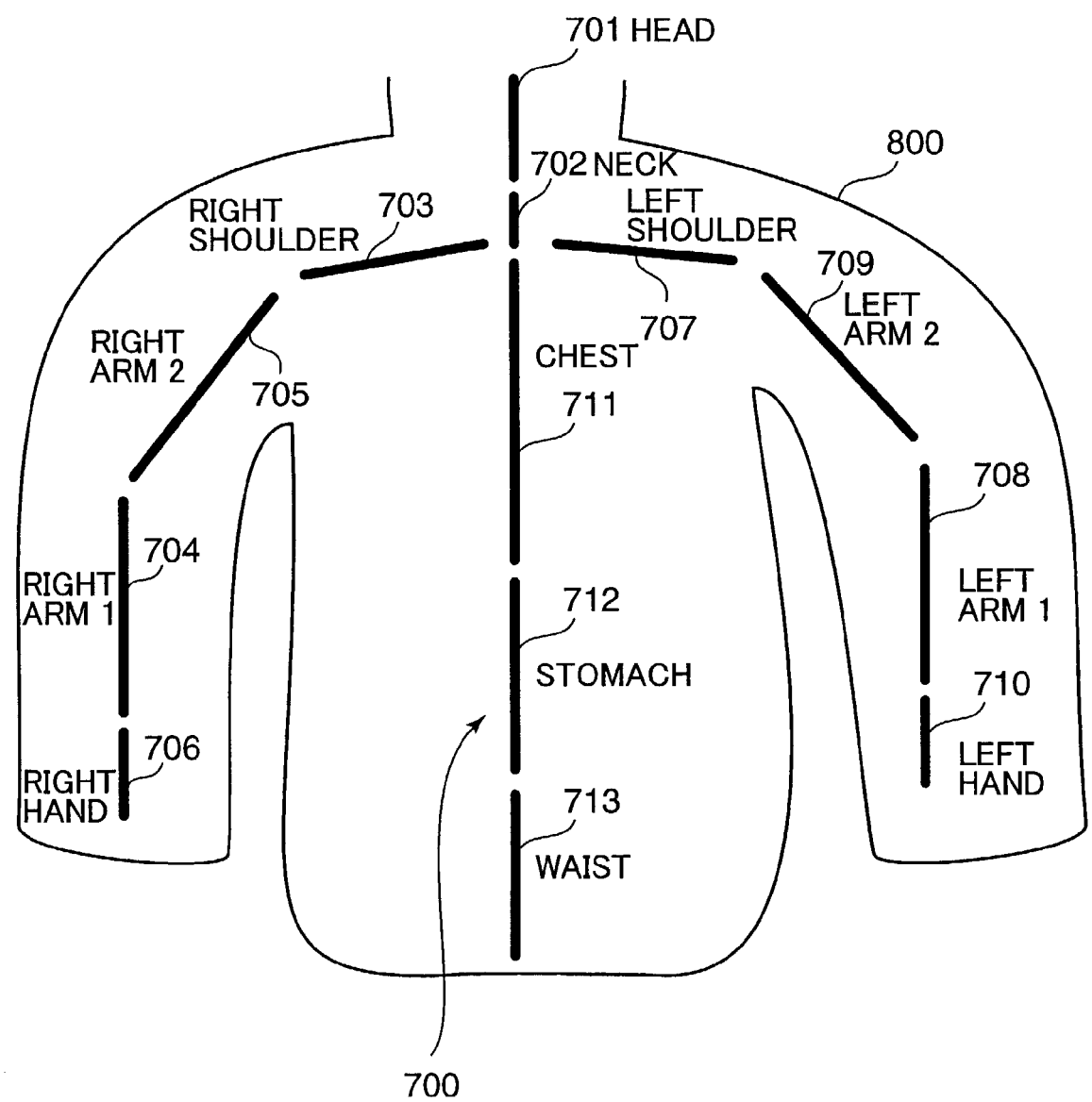
FIG. 4 is an example of skeletons representing the upper half of a human body, specifying the display positions of polygons comprised by a model of an upper garment.

The connectedness storage unit 302 stores the connectedness, which is the degree of connection of vertices comprised by each polygon of the model to each skeleton. For vertices connected to a plurality of skeletons, the connectedness is set such that the sum of connectedness values is 100%. FIG. 4 is one example of a skeleton system 700 representing the upper half of a human body, specifying the display positions of polygons comprised by the upper garment model 800. The skeleton system 700 comprises 13 skeletons, which are the head skeleton 701, neck skeleton 702, right shoulder skeleton 703, right arm 1 skeleton 704, right arm 2 skeleton 705, right hand skeleton 706, left shoulder skeleton 707, left arm 1 skeleton 708, left arm 2 skeleton 709, left hand skeleton 710, chest skeleton 711, stomach skeleton 711, and waist skeleton 713.

FIG. 5 is a table showing an example of the connectedness to each skeleton of each vertex comprised by polygons of the upper garment model 800. Here the polygons of the upper garment model 800 are assumed to comprise the vertices 801, 802, . . . , 899. For example, the vertex 801 is 100% connected to the head skeleton 701; the vertex 802 is 50% connected to the head skeleton 701, and 50% connected to the neck skeleton 702. That is, the movements of the vertex 701 are 100% regulated by the movements of the head skeleton 701, and the movements of the vertex 802 are 50% regulated by the movements of the head skeleton 701 and 50% regulated by the movements of the neck skeleton 702.

The reference movement amount storage unit 303 stores reference movement amounts, set for each skeleton of the model, which are the maximum values of the movement amounts of vertices connected only to the skeleton in question. FIG. 6 is a table showing one example of reference movement amounts for each skeleton. For example, the reference movement amount for the neck skeleton 702 is 2, the reference movement amount for the left arm 2 skeleton 709 is 5, and the reference movement amount for the stomach skeleton 712 is 10. Hence the maximum values of movement amounts of vertices connected only to the neck skeleton 702, left arm 2 skeleton 709, and stomach skeleton 712 are respectively 2, 5, and 10; the movement amount increases in this order, and the undulation amplitude of the upper garment model differs depending on the site.

The movement amount computation unit 310 computes the movement amounts of vertices based on the connectedness stored in the connectedness storage unit 302 and on the reference movement amounts stored in the reference movement amount storage unit 303. The specific method for computation of movement amounts is as follows. First, the maximum movement amount, which is the maximum value of the movement amount, is computed by taking the weighted average of the reference movement amount, with the connectedness as the weighting. For example, if the reference movement amount of a skeleton with connectedness A1% is B1, and the reference movement amount of another skeleton with connectedness A2% is B2, then the maximum movement amount MC is given by the following equation:

$$MC=((A1 \times B1)+(A2 \times B2))/(A1+A2).$$

Where A1+A2=100%.

Next, the maximum movement amount MC is corrected based on the model size. For example, if the size of the model in question is AMS as opposed to the size SMS of a reference model, then the maximum movement amount MC is multiplied by (AMS/SMS). Here the model size is expressed as, for example, the volume of the smallest rectangular parallelepiped (called a bounding box) with faces parallel to coordinate axes which will fit within the model. The larger the model, the larger is the maximum movement amount MC, so that undulation amplitudes are increased, and realistic undulation can be represented.

Then, a random number is generated within the range of the maximum movement amount MC (a random number the value of which ranges from 0 or greater to less than the maximum movement amount MC), derived from the initial value of a random number the value of which is determined based on the vertex coordinates, and the movement amount is computed based on the generated random number. Below, an example of a specific method for calculating movement amounts is explained. First, the initial value SEED of a random number is determined for the coordinate values XN, YN, ZN of the vertices X, Y, Z as follows:

$XX$=(integer part of $XN \times 100$)

$YY$=(integer part of $YN \times 100$)

$ZZ$=(integer part of $ZN \times 100$)

$SEED=12 \times XX+345 \times YY+7689 \times ZZ+BS$

Where the constant BS is the time at which the calculation is executed, converted into a numerical value (for example, if the time is 10:20, the numerical value might be 1020). Consequently when the time at which the calculation is performed changes, the initial value is modified, preventing periodicity in the generated random numbers.

Next, an example of a method to generate random numbers using the initial value SEED is explained.

$TMP=SEED \times SEED \times 12345+SEED \times 6789+SEED$ $VALUE$=(value of 1000's place of $TMP$)$\times 100$+(value of 100's place of $TMP$)$\times 10$+(value of 10's place of $TMP$)

In this way, the random number VALUE is obtained. However, in the next calculation, this random number VALUE is used as the initial value SEED. Through this method, two random numbers VALUE1, VALUE2 are generated.

Next, a method for generating a random number in the range of the maximum movement amount MC (a random number with value in the range from 0 or greater to less than the value of the maximum movement amount MC) is explained. By dividing the smaller among the random numbers VALUE1 and VALUE 2 by the larger, a random number between 0 and 1 is obtained; by multiplying the maximum movement amount MC by this value, a random number within the range of the maximum movement amount MC is obtained.

By generating random numbers derived from an initial value determined based on the vertex coordinates in this way, the movement amounts of vertices with substantially the same coordinates can be made substantially the same.

The direction computation unit 311 generates three random numbers derived from the initial value SEED of a random number determined based on the above-described vertex coordinates, and computes the movement direction based on the generated random numbers. The method of random number generation is similar to the method of random number generation by the movement amount computation unit 310. Here, the movement direction is represented by a vector (VX, VY, VZ) of length 1. The movement direction vector (VX, VY, VZ) is computed by normalizing a vector whose X, Y, Z components are the above three random numbers.

The coordinate computation unit 312 computes the coordinates of a vertex after a prescribed time (for example one frame, where one frame=1/60 second) from the vertex coordinates stored in the vertex coordinate storage unit 301, the movement amount computed by the movement amount computation unit 310, and the movement direction computed by the direction computation unit 311, and stores the coordinates computed for the vertex after movement in the vertex coordinate storage unit 301. Specifically, by adding to the current vertex coordinates a movement vector, obtained by multiplying the movement amount by the movement direction vector, the coordinates of the vertex after movement are computed.

Figure 7:
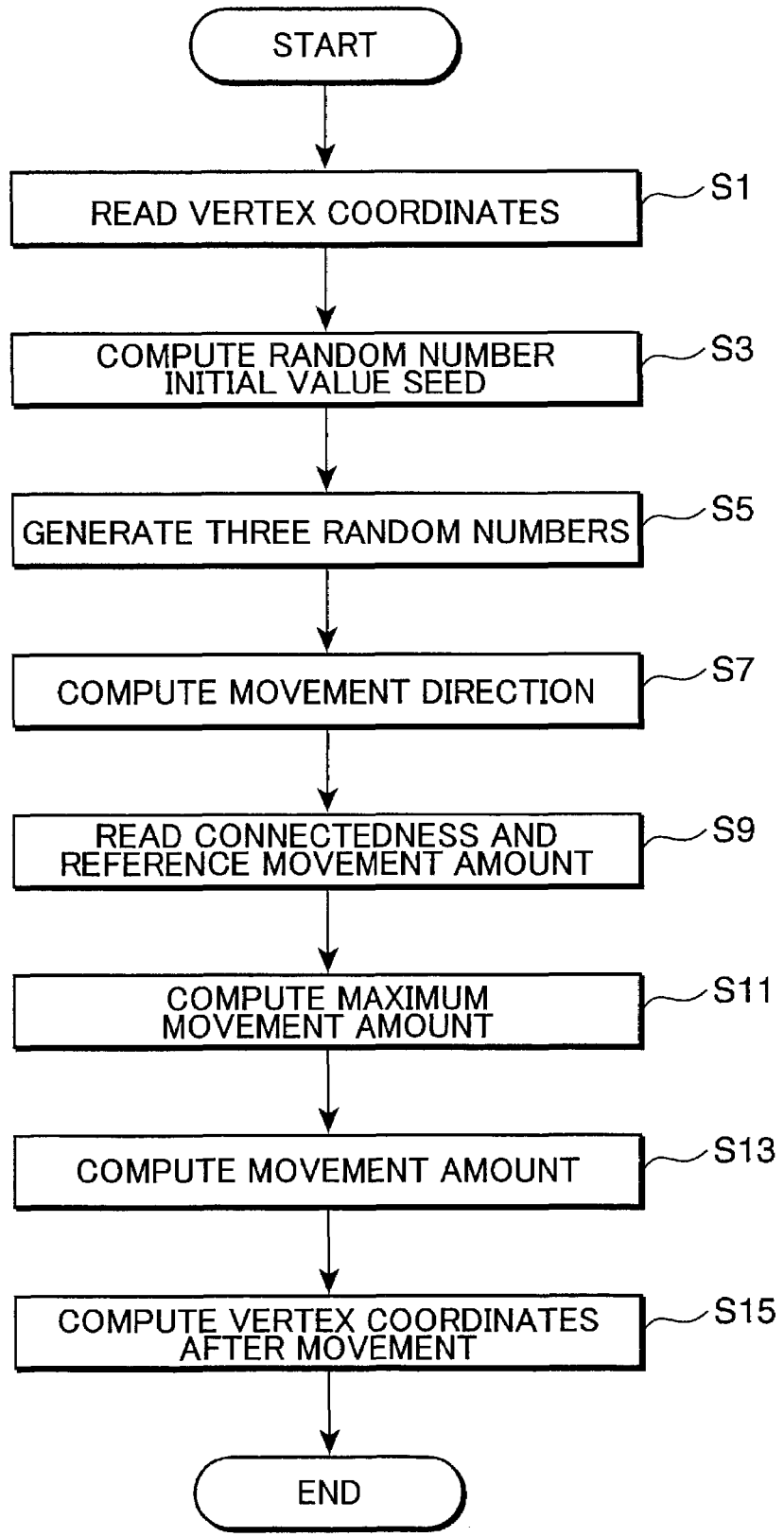
FIG. 7 is a flow chart describing in summary the processing of the dynamic picture image generation device; and, FIGS. 8A and 8B are conceptual diagrams indicating the movement of the vertices of the upper garment model using a dynamic picture image generation device of this invention.

FIG. 7 is a flowchart summarizing the processing of the dynamic picture image generation device. First, the coordinates of vertices comprised by each polygon of a model are read from the vertex coordinate storage unit 301 by the direction computation unit 311 (step S1). Then, the vertex coordinates are used by the direction computation unit 311 to compute the random number initial value SEED (step S3). The direction computation unit 311 then generates three random numbers from the initial value SEED (step S5). And, the direction computation unit 311 uses the three random numbers generated in step S5 to compute the direction of movement of the vertex (step S7).

Then, the connectedness of a vertex to each skeleton is read from the connectedness storage unit 302, and the reference movement amount for each skeleton is read from the reference movement amount storage unit 303, by the movement amount computation unit 310 (step S9). The movement amount computation means 310 then uses the connectedness and reference movement amount to compute the maximum movement amount (step S11). Then, the movement amount computation unit 310 generates a random number within the range of the maximum movement amount computed in step S11 from the initial value SEED, and uses this random number to compute the movement amount (step S13). The coordinate computation unit 312 then uses the movement direction computed in step S7 and the movement amount computed in step S13 to compute the coordinates of the vertex after a prescribed time (after movement), and the coordinates of the vertex after a prescribed time (after movement) are stored in the vertex coordinate storage unit 301 (step S15).

Figure 8A:
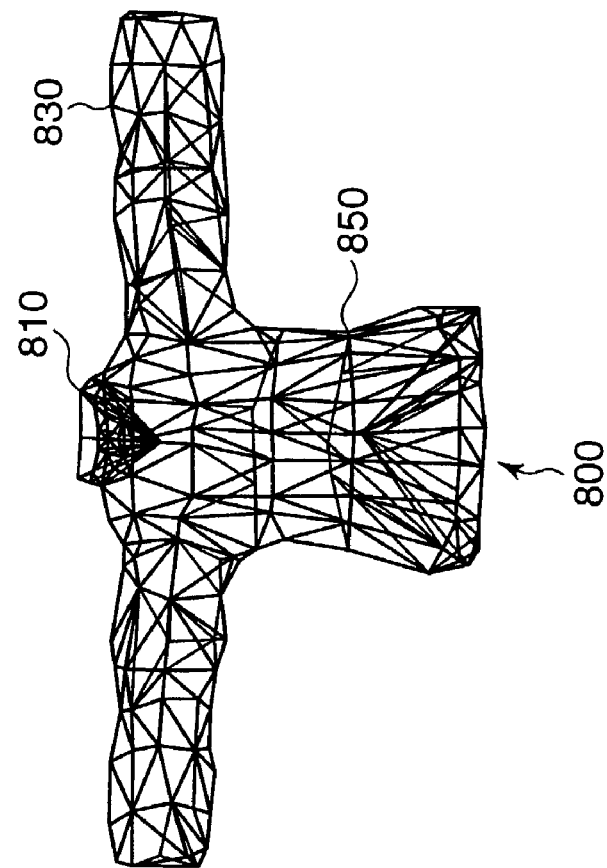
Figure 8B:
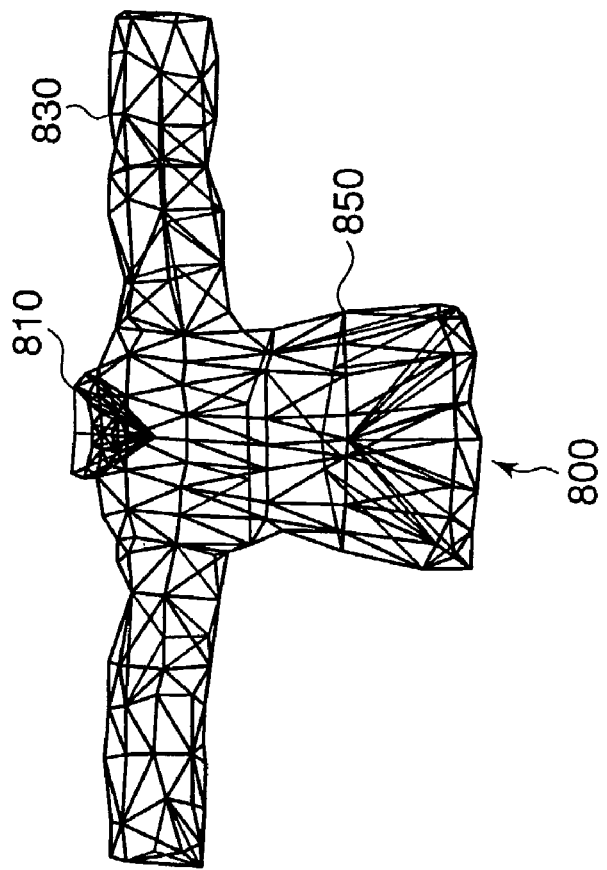

FIGS. 8A and 8B are conceptual diagrams indicating the movement of the vertices of the upper garment model 800 using a dynamic picture image generation device of this invention. Here FIG. 8A shows the initial vertex positions of the upper garment model 800, and FIG. 8B shows the vertex positions of the upper garment model 800 after a prescribed time. The vertex movement amounts are large for the vertex 850 connected to the stomach skeleton 712 (see. FIG. 4), moderate for the vertex 830 connected to the left arm 1 skeleton 708, and small for the vertex 810 connected to the neck skeleton 702. This is because the reference movement amounts for the stomach skeleton 712, left arm 1 skeleton 708, and neck skeleton 702 are respectively 10, 5, and 2 (see. FIG. 6). In this way, because the amplitude of the undulations differs with the site, the sense of realism induced by the undulating image is enhanced.

Further, this invention can assume the following forms.

(A) In the aforementioned descriptions, a form applied to game device was explained; however, a form applied to a device to generate computer graphics or other dynamic picture image or moving images is possible.

(B) In the aforementioned descriptions, the case in which there are vertices connected to a plurality of skeletons was explained; but a form in which vertices are connected to only one skeleton is possible. In this case, processing is simplified.

(C) In the aforementioned descriptions, the case in which the maximum movement amount is corrected based on the model size was explained; but a form in which no corrections are made is also possible. In this case, processing is simplified.

(D) In the aforementioned descriptions, the case in which the model size is expressed by the volume of a bounding box was explained; but forms which use other methods to represent the size are possible. For example, a form may use the model height (the difference between the maximum value and the minimum value of a certain coordinate) to represent the model size. In this case, processing is simplified (E) In the aforementioned descriptions, the case in which the constant BS used when computing the random number initial value SEED is a numerical form of the time was explained; but a form in which the constant BS is determined by another method is also possible. For example, a form may be adopted in which, each time a fixed number (for example, 100) of random numbers are generated, the constant BS is modified according to some rule (for example, the current constant BS plus 100 is used as the constant BS in the next computation). Or, if the name of a file storing the coordinates after movement is set in advance, the numbers resulting from replacement of each letter in the filename with the corresponding ASCII code (for example, 65 for "A", 66 for "B", and so on) may be used to set the constant BS. For example, if the filename consists of three letters, then using the ASCII code BS1 for the first letter, the ASCII code BS2 for the second letter, and the ASCII code BS3 or the third letter, the following formula be used to set the constant BS.

$$BS=BS1 \times BS1 \times BS1 + BS2 \times BS2 \times BS2 \times 2 + BS3 \times BS3 \times BS3 \times 3 + BS1 \times BS1 + BS2 \times BS2 + BS3 \times BS3 + BS1 + BS2 + BS3$$

In summary, the present invention relates to a recording medium which stores a dynamic picture image generation program which generates dynamic picture image in which the surface of a model, comprising a plurality of polygons and a plurality of skeletons specifying the display positions of each polygon, undulates irregularly, wherein a computer is made to function as: vertex coordinate storage means, which stores the coordinates of the vertices comprised by each polygon; connectedness storage means, which stores connectedness, which is the degree of connection of the vertices comprised by each polygon to each skeleton; reference movement amount storage means, set for each skeleton, which stores the amount of reference movement which is the maximum amount of movement of a vertex connected only to the skeleton; movement amount computation means, which computes the amount of movement of a vertex based on the above connectedness and the above reference movement amounts; direction computation means, which computes the movement direction for vertices comprised by each polygon; and coordinate computation means, which computes coordinates after a prescribed amount of time from the above vertex coordinates, from the above movement amounts, and from the above movement directions.

According to the above form of the invention, a dynamic picture image generation program, stored in the recording medium, which generates dynamic picture image in which the surface of a model, comprising a plurality of polygons and a plurality of skeletons specifying the display positions of each polygon, undulates irregularly (the magnitude or the direction of the motion changes irregularly), and the computer is made to function as vertex coordinate storage means, which stores the coordinates of the vertices comprised by each polygon; connectedness storage means, which stores connectedness, which is the degree of connection of the vertices comprised by each polygon to each skeleton; reference movement amount storage means, set for each skeleton, which stores the amount of reference movement which is the maximum amount of movement of a vertex connected only to the skeleton; movement amount computation means, which computes the amount of movement of a vertex based on the connectedness and the reference movement amounts; direction computation means, which computes the movement direction for vertices comprised by each polygon; and, coordinate computation means, which computes coordinates after a prescribed amount of time from the vertex coordinates, from the movement amounts, and from the movement directions.

In other words, the coordinates of the vertices comprised by each polygon are stored in the vertex coordinate storage means; the connectedness, which is the degree of connection of the vertices comprised by each polygon with each skeleton, is stored in the connectedness storage means; reference movement amounts, set for each skeleton, which are the maximum values of movement amounts of vertices connected only to the skeleton, are stored in the reference movement amount storage means; the amounts of movement of vertices are computed by the movement amount computation means based on the connectedness and reference movement amounts; movement directions of vertices comprised by each polygon are computed by the direction computation means; and, the coordinates of vertices after a prescribed time are computed from the coordinates of vertices and from the movement amounts and directions.

In this way, movement amounts of vertices are computed based on connectedness and reference movement amounts in movement amount computation processing, so that by appropriately setting the connectedness and reference movement amounts, the desired (appropriate) movement amounts are obtained. For example, when the clothing worn by a character is blown by the wind and undulates, if reference movement amounts are set for each skeleton such that the connected skeletons differ depending on the site of the clothing model, then movement amounts, that is, the range of undulation will differ (for example, the range of undulation in the vicinity of a collar and a sleeve opening is small, and the range of undulation near the stomach area is large), and so the sense of realism is heightened. Further, movement directions of vertices comprised by each polygon are computed in direction computation processing, and vertex coordinates after a prescribed time are computed from vertex coordinates and from movement amounts and directions in coordinate computation processing, so that realistic undulation can be expressed.

The aforementioned invention can be characterized in that the above movement amount computation means calculates the maximum movement amount, which is the maximum value of the movement amount, by a weighted averaging of the above reference movement amount using the above connectedness as a weighting, and employs this maximum movement amount to calculate the movement amount.

According to the invention with the aforementioned feature, the movement amount computation means computes the maximum movement amount, which is the maximum value of the movement amount, by taking the weighted average of the reference movement amount using the connectedness as a weighting, and employs this maximum movement amount to calculate the movement amount.

That is, the maximum movement amount which is the maximum value of the movement amount is computed by the movement amount computation means by taking the weighted average of the reference movement amount with the connectedness as a weighting, and uses this maximum movement amount to calculate the movement amount.

Because in this way the maximum movement amount which is the maximum value of the movement amount is computed by taking the weighted average of the reference movement amount with the connectedness as weighting, a desired (appropriate) maximum movement amount can easily be calculated. Also, because the maximum movement amount is used to calculate the movement amount, a desired (appropriate) movement amount can easily be calculated.

Furthermore, the invention can be characterized in that the above movement amount computation means corrects the above maximum movement amount based on the size of the model.

According to the invention with the aforementioned feature, the movement amount computation means corrects the maximum movement amount based on the model size.

In other words, the maximum movement amount is corrected by the movement amount computation means based on the size of the model.

In this way, the maximum movement amount is corrected by the movement amount computation means based on the size of the model, so that by, for example, correcting the maximum movement amount in proportion to the size of the model, the magnitude of undulations is proportional to the size of the model, and undulations can be expressed even more realistically.

Moreover, the invention can be characterized in that the above movement amount computation means generates a random number within the range of the above maximum movement amount, and computes the movement amount based on the generated random number.

According to the invention with the aforementioned feature, the movement amount computation means generates a random number within the range of the maximum movement amount (a random number with values between 0 or greater, and less than the maximum movement value), and computes the movement amount based on the generated random number.

In other words, a random number is generated within the range of the maximum movement amount by the movement amount computation means, and the movement amount is computed based on the generated random number.

In this way, a random number is generated within the range of the maximum movement amount, and the movement amount is calculated based on the generated random number, so that movement amounts which vary irregularly (without having a periodicity) within an appropriate range can easily be computed, and natural undulations can be expressed.

Yet moreover, the invention can be characterized in that the above movement amount computation means generates a random number within the range of the above maximum movement amount, derived from the initial value of a random number the value of which is determined based on the coordinates of the above vertex, and computes the movement amount based on the generated random number.

According to the invention with the aforementioned feature, the movement amount computation means generates a random number within the range of the maximum movement amount (a random number with value greater than or equal to 0, and less than the maximum movement amount), derived from an initial value of a random number determined based on the vertex coordinates, and computes the movement amount based on the generated random number.

In other words, a random number is generated by the movement amount computation means within the range of the maximum movement amount, derived from an initial value of a random number determined by a value based on the vertex coordinates, and the movement amount is calculated based on the generated random number.

In this way, a random number is generated within the range of the maximum movement amount, based on an initial value of a random number determined by a value based on the vertex coordinates, and the movement amount is computed based on the generated random number, so that the initial values of random numbers for vertices with substantially equal coordinates are substantially equal, and consequently movement amounts are also substantially equal (because the maximum movement amounts of vertices with substantially equal coordinates are substantially equal). Hence dynamic picture image is generated with no steps (or gaps) between adjacent polygons, and so natural undulation can be represented.

The invention can be further characterized in that the above direction computation means generates three random numbers, and computes the movement direction based on the generated random numbers.

According to the invention with the aforementioned feature, the direction computation means generates three random numbers, and computes the movement direction based on the generated random numbers.

In other words, the direction computation means generates three random numbers, and computes the movement direction based on the generated random numbers.

In this way, three random numbers are generated, and the movement direction is computed based on the generated random numbers, so that, for example, by setting the movement direction equal to the direction of a vector the X, Y, Z components of which are the three random numbers, movement directions which change irregularly (without having a periodicity) can be computed, and natural undulations can be expressed.

Furthermore, the invention can be characterized in that the above direction computation means generates three random numbers derived from an initial value of a random number determined by a value based on the coordinates of the above vertex, and computes the movement direction based on the generated random numbers.

According to the invention with the aforementioned feature, the direction computation means generates three random numbers derived from an initial value of a random number determined by a value based on the coordinates of the vertex, and computes the movement direction based on the generated random numbers.

In other words, three random numbers are generated by the direction computation means derived from an initial value of a random number determined by a value based on the vertex coordinates, and the movement direction is computed based on the generated random numbers.

In this way, three random numbers are generated, derived from an initial value of a random number determined by a value based on the vertex coordinates, and the movement direction is computed based on the generated random numbers, so that the initial values of the random numbers with substantially equal coordinates are substantially equal, and as a result the movement directions are also substantially equal. Hence dynamic picture image can be generated with no steps (or gaps) between adjacent polygons, and natural undulation can be expressed.

The present invention also relates to a dynamic picture image generation method which generates dynamic picture image of the irregular undulation of the surface of a model, comprising a plurality of polygons and a plurality of skeletons specifying the display positions of each polygon, and is characterized in that: the computer stores, in storage means provided in the above computer, the coordinates of the vertices comprised by each polygon, the connectedness, which is the degree of connection to each skeleton of the vertices comprised by each polygon, and reference movement amounts, set for each skeleton, which are the maximum values of the movement amounts of vertices connected only to the skeleton in question; the computer executes movement amount computation processing, in which the movement amount of a vertex is computed based on the above connectedness and the above reference movement amount; the computer executes direction computation processing, in which the movement direction is computed for vertices comprised by each polygon; and, the computer executes coordinate computation processing, in which the coordinates of a vertex after a prescribed time are computed from the above vertex coordinates, the above movement amount, and the above movement direction.

According to the aforementioned invention, in a dynamic picture image generation method which generates dynamic picture image of the irregular undulation (in which the magnitude and direction of motion change irregularly) of the surface of a model, comprising a plurality of polygons and a plurality of skeletons specifying the display positions of each polygon, the computer stores, in storage means provided in the computer, the coordinates of the vertices comprised by each polygon, the connectedness, which is the degree of connection to each skeleton of the vertices comprised by each polygon, and reference movement amounts, set for each skeleton, which are the maximum values of the movement amounts of vertices connected only to the skeleton in question; executes movement amount computation processing, in which the movement amount of a vertex is computed based on the connectedness and the reference movement amount; executes direction computation processing, in which the movement direction is computed for vertices comprised by each polygon; and, executes coordinate computation processing, in which the coordinates of a vertex after a prescribed time are computed from the vertex coordinates, the movement amount, and the movement direction.

That is, the coordinates of vertices comprised by each polygon, the connectedness, which is the degree of connection to each skeleton of vertices comprised by each polygon, and the reference movement amount, set for each skeleton, which is the maximum value of the movement amount of a vertex connected only to the skeleton in question, are stored in storage means provided in the computer; movement amounts for vertices are computed based on the connectedness and reference movement amounts in movement amount computation processing; movement directions of vertices comprised by each polygon are computed in direction computation processing; and the coordinates of vertices after a prescribed time are computed from the vertex coordinates, movement amounts, and movement directions in coordinate computation processing.

In this way, movement amounts of vertices are computed based on connectedness and reference movement amounts in movement amount computation processing, so that by appropriately setting the connectedness and reference movement amounts, the desired (appropriate) movement amounts are obtained. For example, when the clothing worn by a character is blown by the wind and undulates, if reference movement amounts are set for each skeleton such that the connected skeletons differ depending on the site of the clothing model, then movement amounts, that is, the range of undulation will differ (for example, the range of undulation in the vicinity of a collar and a sleeve opening is small, and the range of undulation near the stomach area is large), and so the sense of realism is heightened. Further, movement directions of vertices comprised by each polygon are computed in direction computation processing, and vertex coordinates after a prescribed time are computed from vertex coordinates and from movement amounts and directions in coordinate computation processing, so that realistic undulation can be expressed.

The present invention also takes a form of a dynamic picture image generation device which generates dynamic picture image of the irregular undulation of the surface of a model, comprising a plurality of polygons and a plurality of skeletons specifying the display positions of each polygon, and is characterized in comprising: vertex coordinate storage means, which stores the coordinates of vertices comprised by each polygon; connectedness storage means, which stores connectedness, which is the degree of connection to each skeleton of the vertices comprised by each polygon; reference movement amount storage means, which stores reference movement amounts, set for each skeleton, which are the maximum value of the movement amount of a vertex connected only to the skeleton; movement amount computation means, which computes the movement amount of a vertex based on the above connectedness and the above reference movement amount; direction computation means, which computes the movement direction of the vertices comprised by each polygon; and coordinate computation means, which computes vertex coordinates after a prescribed time from the above vertex coordinates, and from the above movement amounts and directions.

According to the aforementioned form of the invention, a dynamic picture image generation device which generates dynamic picture image of the irregular undulation (in which the magnitude and direction of the movement change irregularly) of the surface of a model, comprising a plurality of polygons and a plurality of skeletons specifying the display positions of each polygon, comprises vertex coordinate storage means, which stores the coordinates of vertices comprised by each polygon; connectedness storage means, which stores connectedness, which is the degree of connection to each skeleton of the vertices comprised by each polygon; reference movement amount storage means, which stores reference movement amounts, set for each skeleton, which are the maximum value of the movement amount of a vertex connected only to the skeleton; movement amount computation means, which computes the movement amount of a vertex based on the connectedness and the reference movement amount; direction computation means, which computes the movement direction of the vertices comprised by each polygon; and, coordinate computation means, which computes vertex coordinates after a prescribed time from the vertex coordinates, and from the movement amounts and directions.

In other words, the vertex coordinate storage means stores the coordinates of vertices comprised by each polygon; the connectedness storage means stores the connectedness, which is the degree of connection to each skeleton of a vertex comprised by each polygon; the reference movement amount storage means stores the reference movement amounts, set for each skeleton, which are the maximum values of the movement amounts of the vertices connected only to the skeleton; the movement amount computation means computes the movement amount of a vertex, based on the connectedness and reference movement amount; the direction computation means computes the movement direction of vertices comprised by each polygon; and the coordinate computation means computes the coordinates of a vertex after a prescribed time, from the magnitude and direction of movement of the coordinates of the vertex.

In this way, movement amounts of vertices are computed by the movement amount computation means based on the connectedness and reference movement amounts, so that by appropriately setting the connectedness and reference movement amount, the desired (appropriate) movement amount is obtained. For example, when a model of the clothing worn by a character is blown by the wind and undulates, if different reference movement amounts are set for each skeleton such that the connected skeletons differ depending on the site of the clothing model, then movement amounts, that is, the range of undulation will differ (for example, the range of undulation in the vicinity of a collar and a sleeve opening is small, and the range of undulation near the stomach area is large), and so the sense of realism is heightened. Further, movement directions of vertices comprised by each polygon are computed by the direction computation means, and vertex coordinates after a prescribed time are computed from vertex coordinates and from movement amounts and directions by the coordinate computation means, so that realistic undulation can be expressed.

This application is based on Japanese patent application serial no. 2001-240447, filed in Japan Patent Office on Aug. 8, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium which stores a dynamic picture image generation program for generating dynamic picture image in which the surface of a model, comprising a plurality of polygons and a plurality of skeletons, said skeletons comprising a plurality of skeletal links, said polygons and skeletal links specifying the display positions of each polygon, undulates irregularly, said program causes a computer to function as:

vertex coordinate storage means for storing the coordinates of the vertices comprised by each polygon;

connectedness storage means for storing connectedness, which is the degree of connection of the vertices comprised by each polygon to each skeletal link, wherein one or more of said vertices connects to a plurality of said skeletal links;

reference movement amount storage means, set for each skeletal link, for storing the amount of reference movement which is the maximum amount of movement of a vertex connected only to the skeletal link;

movement amount computation means for computing the amount of movement of a vertex based on said connectedness and said reference movement amounts;

direction computation means for computing the movement direction for vertices comprised by each polygon; and, coordinate computation means for computing the coordinates of vertices after a prescribed amount of time from said vertex coordinates, said movement amounts, and said movement directions.

2. The recording medium according to claim 1, wherein said movement amount computation means calculate the maximum movement amount, which is the maximum value of the movement amount, by a weighted averaging of said reference movement amount using said connectedness as a weighting, and employ this maximum movement amount to calculate the movement amount.

3. The recording medium according to claim 2, wherein said movement amount computation means corrects said maximum movement amount based on the size of the model.

4. The recording medium according to claim 2, wherein said movement amount computation means generate a random number within the range of said maximum movement amount, and compute the movement amount based on the generated random number.

5. The recording medium according to claim 4, wherein said movement amount computation means generate a random number within the range of said maximum movement amount, derived from the initial value of a random number with a value determined on the basis of the coordinates of said vertex, and compute the movement amount based on the generated random number.

6. The recording medium according to claim 1, wherein said direction computation means generate three random numbers, and compute the movement direction based on the generated random numbers.

7. The recording medium according to claim 6, wherein said direction computation means generate three random numbers derived from an initial value of a random number with a value determined on the basis of the coordinates of said vertex, and compute the movement direction based on the generated random numbers.

8. A dynamic picture image generation method for generating dynamic picture image of the irregular undulation of the surface of a model which comprises a plurality of polygons and a plurality of skeletons, said skeletons comprising a plurality of skeletal links, said polygons and skeletal links specifying the display positions of each polygon, and wherein the computer stores, in storage means provided in said computer, the coordinates of the vertices comprised by each polygon, wherein the computer executing the following steps:
- connectedness storage processing for computing connectedness, which is the degree of connection of the vertices comprised by each polygon to each skeletal link, wherein one or more of said vertices connects to a plurality of said skeletal links;
- reference movement amount processing, set for each skeletal link, for computing the amount of reference movement which is the maximum amount of movement of a vertex connected only to the skeletal link;
- movement amount computation processing for computing the movement amount of a vertex based on said connectedness and on said reference movement amount;
- direction computation processing for computing the movement direction for vertices comprised by each polygon; and
- coordinate computation processing for computing the coordinates of a vertex after a prescribed time from said vertex coordinates, said movement amount, and said movement direction.

9. A dynamic picture image generation device for generating dynamic picture image of the irregular undulation of the surface of a model, comprising a plurality of polygons and a plurality of skeletons, said skeletons comprising a plurality of skeletal links, said polygons and skeletal links specifying the display positions of each polygon, said dynamic picture image generation device comprising:
- vertex coordinate storage means for storing the coordinates of vertices comprised by each polygon;
- connectedness storage means for storing connectedness, which is the degree of connection to each skeletal link of the vertices comprised by each polygon, wherein one or more of said vertices connects to a plurality of said skeletal links;
- reference movement amount storage means for storing reference movement amounts, set for each skeletal link, which are the maximum value of the movement amount of a vertex connected only to the skeletal link;
- movement amount computation means for computing the movement amount of a vertex based on said connectedness and on said reference movement amount;
- direction computation means for computing the movement direction of the vertices comprised by each polygon; and,
- coordinate computation means for computing vertex coordinates after a prescribed time from said vertex coordinates, said movement amounts and said movement directions.

10. A dynamic picture image generation program for generating dynamic picture image in which the surface of a model, comprising a plurality of polygons and a plurality of skeletons, said skeletons comprising a plurality of skeletal links, said polygons and skeletal links specifying the display positions of each polygon, undulates irregularly, said program causes a computer to function as:
- vertex coordinate storage means for storing the coordinates of the vertices comprised by each polygon;
- connectedness storage means for storing connectedness, which is the degree of connection of the vertices comprised by each polygon to each skeletal link, wherein one or more of said vertices are connects to a plurality of said skeletal links;
- reference movement amount storage means, set for each skeletal link, for storing the amount of reference movement which is the maximum amount of movement of a vertex connected only to the skeletal link;
- movement amount computation means for computing the amount of movement of a vertex based on said connectedness and said reference movement amounts;
- direction computation means for computing the movement direction for vertices comprised by each polygon; and,
- coordinate computation means for computing the coordinates of vertices after a prescribed amount of time from said vertex coordinates, said movement amounts, and said movement directions.

* * * * *